(12) United States Patent
Kouda et al.

(10) Patent No.: US 11,179,922 B2
(45) Date of Patent: Nov. 23, 2021

(54) BARRIER LAMINATE FILM (71) Applicant: MITSUI CHEMICALS TOHCELLO, INC., Tokyo (JP)

(72) Inventors: Chikako Kouda, Sodegaura (JP); Tatsuya Shibata, Ichihara (JP); Kazuyuki Fukuda, Ichihara (JP); Takashi Uchida, Chiba (JP); Kenji Odagawa, Ichihara (JP); Shuji Tahara, Ichihara (JP); Shingo Suzuki, Koga (JP); Daisuke Matoba, Utsunomiya (JP); Yasuaki Shinkawa, Yokohama (JP); Eiichi Moriya, Koga (JP); Akira Nomoto, Koga (JP)

(73) Assignee: MITSUI CHEMICALS TOHCELLO, INC., Tokyo (JP)

( * ) Notice: Subject to any disclaimer, the term of this patent is extended or adjusted under 35 U.S.C. 154(b) by 128 days.

(21) Appl. No.: 16/499,403

(22) PCT Filed: Mar. 28, 2018

(86) PCT No.: PCT/JP2018/012707
§ 371 (c)(1),
(2) Date: Sep. 30, 2019

(87) PCT Pub. No.: WO2018/181457
PCT Pub. Date: Oct. 4, 2018

(65) Prior Publication Data
US 2021/0107264 A1 Apr. 15, 2021

(30) Foreign Application Priority Data
Mar. 31, 2017 (JP) .............................. JP2017-072765

(51) Int. Cl.
*B32B 27/14* (2006.01)
*B32B 9/00* (2006.01)
(Continued)

(52) U.S. Cl.
CPC .............. *B32B 27/14* (2013.01); *B32B 9/005* (2013.01); *B32B 27/34* (2013.01); *B32B 27/40* (2013.01);
(Continued)

(58) Field of Classification Search
CPC . B32B 1/00; B32B 2305/347; B32B 2307/41; B32B 2307/416; B32B 2307/422; B32B 27/304; B32B 7/023; B32B 7/08
See application file for complete search history.

(56) References Cited

U.S. PATENT DOCUMENTS

2007/0092717 A1 4/2007 Yoshida et al.
2015/0337139 A1* 11/2015 Mori ...................... C08J 7/0423
428/425.5
(Continued)

FOREIGN PATENT DOCUMENTS

CN 104194614 A 12/2014
JP 2005225940 A 8/2005
(Continued)

OTHER PUBLICATIONS

International Search Report (PCT/ISA/210) and translation and Written Opinion (PCT/ISA/237) dated Jul. 3, 2018, by the Japanese Patent Office as the International Searching Authority for International Application No. PCT/JP2018/012707.
(Continued)

*Primary Examiner* — Lawrence D Ferguson
(74) *Attorney, Agent, or Firm* — Buchanan, Ingersoll & Rooney PC (57) ABSTRACT

A barrier laminate film (100) of the present invention includes: a base material layer (101), a stress relaxation layer (102), an inorganic material layer (103), and a barrier resin layer (104) in this order. The barrier resin layer (104) includes an amide cross-linked compound of a polycarbox-
(Continued)

ylic acid and a polyamine, and the stress relaxation layer (102) includes a polyurethane-based resin having an aromatic ring structure in a main chain.

13 Claims, 1 Drawing Sheet

(51) Int. Cl.
  *B32B 27/34* (2006.01)
  *B32B 27/40* (2006.01)
  *B32B 37/24* (2006.01)
(52) U.S. Cl.
  CPC ........ *B32B 37/24* (2013.01); *B32B 2037/246* (2013.01); *B32B 2250/04* (2013.01); *B32B 2255/10* (2013.01); *B32B 2255/205* (2013.01); *B32B 2264/107* (2013.01); *B32B 2264/1021* (2020.08); *B32B 2264/1023* (2020.08); *B32B 2264/1052* (2020.08); *B32B 2264/12* (2013.01); *B32B 2307/7244* (2013.01); *B32B 2307/7246* (2013.01); *B32B 2307/732* (2013.01); *B32B 2439/70* (2013.01)

(56) References Cited

U.S. PATENT DOCUMENTS

| | | |
|---|---|---|
| 2017/0341352 A1 | 11/2017 | Kidokoro et al. |
| 2018/0037002 A1 | 2/2018 | Yamazaki et al. |
| 2018/0126696 A1 | 5/2018 | Suzuki et al. |

FOREIGN PATENT DOCUMENTS

| | | | |
|---|---|---|---|
| JP | 2008132761 A | 6/2008 | |
| JP | 2013100399 A | 5/2013 | |
| JP | 2014184678 A | 10/2014 | |
| JP | 2014189567 A | 10/2014 | |
| JP | 2015218267 A | 12/2015 | |
| JP | 2016-049780 A | 4/2016 | |
| JP | 2016064650 A | 4/2016 | |
| JP | 2016120460 A | 7/2016 | |
| JP | 2017014307 A | 1/2017 | |
| WO | 2016052123 A1 | 4/2016 | |
| WO | 2016088534 A1 | 6/2016 | |
| WO | 2016/136768 A1 | 9/2016 | |
| WO | 2016186074 A1 | 11/2016 | |
| WO | WO 2016186074 A1 * | 11/2016 | |

OTHER PUBLICATIONS

Extended European Search Report dated Nov. 23, 2020, by the European Patent Office in corresponding European Patent Application No. 18776134.1. (9 pages).

Office Action dated Jan. 29, 2021, by the State Intellectual Property Office of the People's Republic of China in corresponding Chinese Patent Application No. 201880021193.5. (9 pages).

* cited by examiner

BARRIER LAMINATE FILM

TECHNICAL FIELD

The present invention relates to a barrier laminate film.

BACKGROUND ART

As a barrier film, a barrier laminate film which is provided with an inorganic material layer as a barrier layer on a base material layer is known.

However, this inorganic material layer is weak against friction and the like, and in such the barrier laminate film, cracks may occur in the inorganic material layer due to rubbing or elongation at the time of post-processing printing, laminating, content filling, or the like, and a barrier property may decrease.

Therefore, a barrier laminate film in which an organic material layer is further stacked on the inorganic material layer as a barrier layer is also used.

As a barrier film using an organic material layer as the barrier layer, a barrier laminate film which is provided with a barrier resin layer formed of a mixture including a polycarboxylic acid and a polyamine is known.

Examples of techniques related to such a barrier laminate film include those described in Patent Document 1 (Japanese Unexamined patent publication No. 2005-225940) and Patent Document 2 (Japanese Unexamined patent publication No. 2014-184678).

Patent Document 1 discloses a gas barrier film having a gas barrier layer film-formed from a polycarboxylic acid and a polyamine and/or a polyol and having a polycarboxylic acid cross-linking degree of 40% or more.

Patent Document 2 discloses a gas barrier film formed of a mixture obtained by mixing components such that polyamine/polycarboxylic acid is 12.5/87.5 to 27.5/72.5 and (polyamine+polycarboxylic acid)/flaky inorganic substances is 100/5 to 50, on at least one side of a base material formed of a plastic film.

RELATED DOCUMENT

Patent Document

[Patent Document 1] Japanese Unexamined Patent Publication No. 2005-225940
[Patent Document 2] Japanese Unexamined Patent Publication No. 2014-184678

SUMMARY OF THE INVENTION

Technical Problem

The level of the techniques required for various properties of a barrier film becomes higher and higher.

Although a barrier laminate film which is provided with a barrier resin layer formed of a mixture including a polycarboxylic acid and a polyamine has excellent barrier properties due to the amide cross-linked structure formed by the polyamine and the polycarboxylic acid, from the viewpoint of securing more stable performance, a water vapor barrier property or an oxygen barrier property is required to be further improved particularly after a retort treatment.

Furthermore, in after the retort treatment, the barrier laminate film which is provided with a barrier resin layer formed of a mixture including a polycarboxylic acid and a polyamine is required to further improve an ability to conform to external deformation from the viewpoint of securing stable performance.

The present invention has been made in view of the above circumstances, and an object thereof is to provide a barrier laminate film excellent in barrier properties, in particular, a water vapor barrier property and an oxygen barrier property before and after a retort treatment, and in adhesion between layers of a base material layer and a barrier resin layer.

Solution to Problem

The present inventors have conducted intensive studies in order to solve the above object. As a result, in a barrier laminate film obtained by providing a stress relaxation layer including a polyurethane-based resin having an aromatic ring structure in a main chain between the base material layer and the inorganic material layer, it has been found that both a barrier property before and after the retort treatment and adhesion between layers of the base material layer and the barrier resin layer can be improved in a well-balanced manner.

According to the present invention, the following barrier laminate film and a package for retort food are provided.

[1]
A barrier laminate film including a base material layer; a stress relaxation layer; an inorganic material layer; and a barrier resin layer in this order, in which the barrier resin layer includes an amide cross-linked compound of a polycarboxylic acid and a polyamine, and the stress relaxation layer includes a polyurethane-based resin having an aromatic ring structure in a main chain.

[2]
The barrier laminate film according to [1], in which a 180° peel strength P between the base material layer and the barrier resin layer, measured under conditions of 25° C. and a tension rate of 300 mm/min after subjecting the barrier laminate film to a retort treatment at 130° C. for 30 minutes is 0.5 N/15 mm or more.

[3]
The barrier laminate film according to [1] or [2], in which, when a 180° peel strength between the base material layer and the barrier resin layer, measured under conditions of 25° C. and a tension rate of 300 mm/min after subjecting the barrier laminate film to a retort treatment at 130° C. for 30 minutes is P [N/15 mm] and a thickness of the stress relaxation layer is T [µm], P/T is equal to or more than 2.0 and equal to or less than 15.0.

[4]
The barrier laminate film according to any one of [1] to [3], in which a thickness of the stress relaxation layer is equal to or more than 0.05 µm and equal to or less than 1.0 µm.

[5]
The barrier laminate film according to any one of [1] to [4], in which a water vapor permeability at 40° C. and 90% RH is 4.0 g/(m$^2$·24 h) or less.

[6]
The barrier laminate film according to any one of [1] to [5], in which an oxygen permeability at 20° C. and 90% RH is 10.0 ml/(m$^2$·24 h·MPa) or less.

[7]
The barrier laminate film according to any one of [1] to [6], in which, in an infrared absorption spectrum of the stress relaxation layer, when a maximum peak of an absorption band in a range of equal to or more than 715 cm$^{-1}$ and equal to or less than 745 cm$^{-1}$ is $A_0$ and a maximum peak of an absorption band in a range of equal to or more than 1705 cm$^{-1}$ and equal to or less than 1735 cm$^{-1}$ is A$_1$, a ratio of the maximum peaks (A$_0$/A$_1$) is equal to or more than 0.20 and equal to or less than 0.90.

[8]

The barrier laminate film according to any one of [1] to [7], in which the polyurethane-based resin includes an aromatic polyester skeleton.

[9]

The barrier laminate film according to any one of [1] to [8], in which the inorganic material layer contains one type or two or more types of inorganic materials selected from the group consisting of silicon oxide, silicon oxynitride, silicon nitride, aluminum oxide, and aluminum.

[10]

The barrier laminate film according to any one of [1] to [9], in which, in an infrared absorption spectrum of the barrier resin layer, when a total peak area of an absorption band in a range of equal to or more than 1493 cm$^{-1}$ and equal to or less than 1780 cm$^{-1}$ is A, and a total peak area of an absorption band in a range of equal to or more than 1598 cm$^{-1}$ and equal to or less than 1690 cm$^{-1}$ is B, an area ratio of an amide bond indicated by B/A is 0.370 or more.

[11]

The barrier laminate film according to any one of [1] to [10], in which a water vapor permeability at 40° C. and 90% RH after subjecting the barrier laminate film to a retort treatment at 130° C. for 30 minutes is 4.0 g/(m$^2$·24 h) or less.

[12]

The barrier laminate film according to any one of [1] to [11], in which a thickness of the barrier resin layer is equal to or more than 0.01 μm and equal to or less than 15 μm.

[13]

The barrier laminate film according to any one of [1] to [12], in which an oxygen permeability at 20° C. and 90% RH after subjecting the barrier laminate film to a retort treatment at 130° C. for 30 minutes is 10.0 ml/(m$^2$·24 h·MPa) or less.

[14]

The barrier laminate film according to any one of [1] to [13], in which the barrier laminate film is used for a packaging material for retort food.

Advantageous Effects of Invention

According to the present invention, it is possible to provide a barrier laminate film excellent in adhesion between layers of the base material layer and the barrier resin layer while being excellent in the barrier properties, in particular, barrier properties before and after the retort treatment.

BRIEF DESCRIPTION OF THE DRAWING

The above objects and other objects, features and advantages will become more apparent from the following description of a preferable embodiment and the accompanying drawing.

DESCRIPTION OF EMBODIMENT

Figure 1:
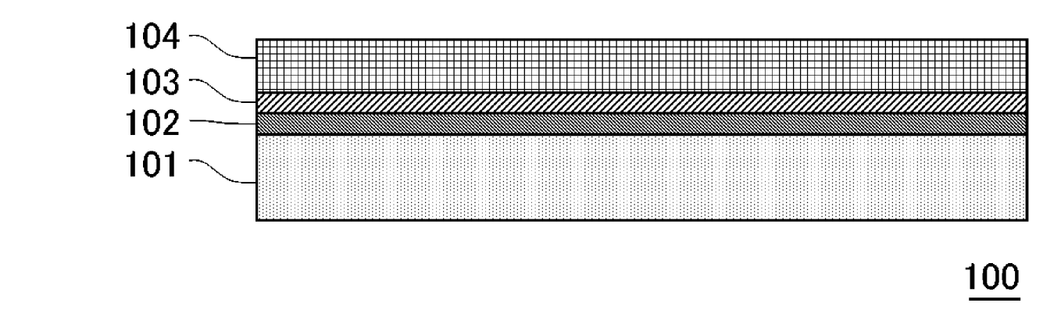
FIG. 1 is a cross-sectional view schematically showing an example of a structure of a barrier laminate film of an embodiment according to the present invention.

Description will be given below of an embodiment of the present invention with reference to the drawing. Note that, the FIGURE is a schematic view and does not match the actual size ratio. Note that, "to" between numbers in the sentences means "equal to or more than first number and equal to or less than second number" unless otherwise noted.

<Barrier Laminate Film>

FIG. 1 is cross-sectional view schematically showing an example of a structure of a barrier laminate film 100 of an embodiment according to the present invention.

The barrier laminate film 100 according to the present embodiment includes a base material layer 101, a stress relaxation layer 102, an inorganic material layer 103, and a barrier resin layer 104 in this order. The barrier resin layer 104 includes an amide cross-linked compound of a polycarboxylic acid and a polyamine and the stress relaxation layer 102 includes a polyurethane-based resin having an aromatic ring structure in a main chain.

According to the present embodiment, in the barrier laminate film 100 obtained by providing the stress relaxation layer 102 including the polyurethane-based resin having the aromatic ring structure in the main chain between the base material layer 101 and the inorganic material layer 103, both barrier properties before and after the retort treatment and adhesion between layers of the base material layer 101 and the barrier resin layer 104 can be improved in a well-balanced manner.

That is, in the barrier laminate film 100 according to the present embodiment, by providing the stress relaxation layer 102 including the polyurethane-based resin having the aromatic ring structure in the main chain between the base material layer 101 and the inorganic material layer 103, barrier properties before and after the retort treatment and adhesion between layers of the base material layer 101 and the barrier resin layer 104 can be improved effectively.

From the above, according to the present embodiment, the barrier laminate film 100 excellent in adhesion between layers of the base material layer and the barrier resin layer while being excellent in barrier properties after the retort treatment can be realized.

In the barrier laminate film 100, from the viewpoint of further improving the adhesion between layers of the base material layer 101 and the barrier resin layer 104 after the retort treatment, when a 180° peel strength between the base material layer 101 and the barrier resin layer 104 measured under conditions of 25° C. and a tension rate of 300 mm/min after subjecting the barrier laminate film 100 to the retort treatment at 130° C. for 30 minutes is P (N/15 mm) and a thickness of the stress relaxation layer 102 is T (μm), P/T is preferably equal to or more than 2.0 and equal to or less than 15.0, and more preferably equal to or more than 2.0 and equal to or less than 13.0.

P/T can be achieved, for example, by adjusting a thickness or a constituent material of the stress relaxation layer 102, a thickness or a constituent material of the inorganic material layer 103, a thickness or a constituent material of the barrier resin layer 104.

In the barrier laminate film 100, from the viewpoint of further improving a water vapor barrier property, a water vapor permeability measured under conditions of a temperature of 40° C. and a humidity of 90% RH is preferably 4.0 g/(m$^2$·24 h) or less, more preferably 3.5 g/(m$^2$·24 h) or less, even more preferably 3.0 g/(m$^2$·24 h) or less, still more preferably 2.5 g/(m$^2$·24 h) or less, and particularly preferably 2.0 g/(m$^2$·24 h) or less.

The water vapor permeability can be achieved, for example, by adjusting the thickness or the constituent material of the inorganic material layer 103, the thickness or the constituent material of the barrier resin layer 104.

In the barrier laminate film 100, from the viewpoint of further improving the oxygen barrier property, an oxygen permeability measured under conditions of a temperature of 20° C. and a humidity of 90% RH is preferably 10.0 ml/(m$^2$·24 h·MPa) or less, more preferably 5.0 ml/(m$^2$·24 h·MPa) or less, even more preferably 3.0 ml/(m$^2$·24 h·MPa) or less, still more preferably 1.5 ml/(m$^2$·24 h·MPa) or less, and particularly preferably 1.0 ml/(m$^2$·24 h·MPa) or less.

The oxygen permeability can be achieved, for example, by adjusting the thickness or the constituent material of the inorganic material layer 103, the thickness or the constituent material of the barrier resin layer 104.

Note that, the oxygen permeability is measured according to JIS K7126 under conditions of a temperature of 20° C. and a humidity of 90% RH.

In the barrier laminate film 100, from the viewpoint of further improving the water vapor barrier property after the retort treatment, the water vapor permeability measured at 40° C. and 90% RH after subjecting the barrier laminate film 100 to the retort treatment at 130° C. for 30 minutes is preferably 4.0 g/(m$^2$·24 h) or less, more preferably 3.5 g/(m$^2$·24 h) or less, even more preferably 3.0 g/(m$^2$·24 h) or less, preferably 2.5 g/(m$^2$·24 h) or less, and particularly preferably 2.0 g/(m$^2$·24 h) or less.

The water vapor permeability of the barrier laminate film 100 after the retort treatment can be achieved, for example, by adjusting the thickness or the constituent material of the stress relaxation layer 102, the thickness or the constituent material of the inorganic material layer 103, the thickness or the constituent material of the barrier resin layer 104.

In the barrier laminate film 100, from the viewpoint of further improving the oxygen barrier property after the retort treatment, the oxygen permeability measured under the conditions of a temperature of 20° C. and a humidity of 90% RH after subjecting the barrier laminate film to the retort treatment at 130° C. for 30 minutes is preferably 10.0 ml/(m$^2$·24 h·MPa) or less, more preferably 5.0 ml/(m$^2$·24 h·MPa) or less, even more preferably 3.0 ml/(m$^2$·24 h·MPa) or less, still more preferably 1.5 ml/(m$^2$·24 h·MPa) or less, and particularly preferably 1.0 ml/(m$^2$·24 h·MPa) or less.

The oxygen permeability of the barrier laminate film 100 after the retort treatment can be achieved, for example, by adjusting the thickness or the constituent material of the stress relaxation layer 102, the thickness or the constituent material of the inorganic material layer 103, the thickness or the constituent material of the barrier resin layer 104. Note that, the oxygen permeability is measured according to JIS K7126 under conditions of a temperature of 20° C. and a humidity of 90% RH.

The barrier laminate film 100, even after the retort treatment, is excellent in adhesion between the base material layer 101 and the barrier resin layer 104. In the barrier laminate film 100, from the viewpoint of further improving adhesion between the base material layer 101 and the barrier resin layer 104 after the retort treatment, when a 180° peel strength between the base material layer 101 and the barrier resin layer 104 measured under conditions of 25° C. and a tension rate of 300 mm/min after subjecting the barrier laminate film 100 to the retort treatment at 130° C. for 30 minutes is P, P is preferably 0.5 N/15 mm or more, more preferably 0.7 N/15 mm or more, even more preferably 1.0 N/15 mm or more, still more preferably 1.5 N/15 mm or more, and particularly preferably 1.8 N/15 mm or more.

The 180° peel strength P between the base material layer 101 and the barrier resin layer 104 can be achieved, for example, by adjusting the thickness or the constituent material of the stress relaxation layer 102, the thickness or the constituent material of the inorganic material layer 103, the thickness or the constituent material of the barrier resin layer 104.

A description will be given below of each layer forming the barrier laminate film 100.

[Barrier Resin Layer]

The barrier resin layer 104 according to the present embodiment includes an amide cross-linked compound of a polycarboxylic acid and a polyamine, for example, the barrier resin layer 104 can be formed by heating and curing a mixture including the polycarboxylic acid and the polyamine.

In addition, in the infrared absorption spectrum of the barrier resin layer 104, when a total peak area of an absorption band in a range of 1493 cm$^{-1}$ to 1780 cm$^{-1}$ is A, and a total peak area of an absorption band in a range of 1598 cm$^{-1}$ to 1690 cm$^{-1}$ is B, an area ratio of an amide bond indicated by B/A is, from the viewpoint of barrier properties, preferably 0.370 or more, more preferably 0.400 or more, even more preferably 0.420 or more, and particularly preferably 0.430 or more. In addition, from the viewpoint of further improving a balance between appearance, dimensional stability, and productivity, an upper limit of the area ratio of the amide bond indicated by B/A is preferably 0.700 or less, more preferably 0.680 or less, and particularly preferably 0.650 or less.

Here, it is possible to obtain the barrier resin layer 104 in which B/A described above is the lower limit value or more by heating a mixture including the polycarboxylic acid and the polyamine in a specific ratio (also referred to below as a barrier coating material) under specific heating conditions.

In the barrier resin layer 104, absorption based on υC=O of the unreacted carboxylic acid in the infrared absorption spectrum is observed in the vicinity of 1700 cm$^{-1}$ and absorption based on υC=O of the amide bond which is a cross-linked structure is observed in the vicinity of 1630 to 1685 cm$^{-1}$, and absorption based on υC=O of the carboxylate is observed in the vicinity of 1540 to 1560 cm$^{-1}$.

That is, in the present embodiment, it is considered that the total peak area A in the range of the absorption band of equal to or more than 1493 cm$^{-1}$ and equal to or less than 1780 cm$^{-1}$ in the infrared absorption spectrum represents an indicator of a total amount of the carboxylic acid, the amide bond, and the carboxylate, the total peak area B in the range of the absorption band of equal to or more than 1598 cm$^{-1}$ and equal to or less than 1690 cm$^{-1}$ represents an indicator of an amount of amide bonds present therein, the total peak area C in the range of the absorption band of equal to or more than 1690 cm$^{-1}$ and equal to or less than 1780 cm described below represents an indicator of the amount of the unreacted carboxylic acid present therein, the total peak area D in the range of an absorption band of equal to or more than 1493 cm$^{-1}$ and equal to or less than 1598 cm$^{-1}$ described below represents an indicator of the amount of the carboxylate present therein, that is, an ionic cross-linking of the carboxyl group and the amino group.

Note that, in the present embodiment, it is possible to measure the total peak areas A to D by the following procedure.

First, a 1 cm×3 cm measurement sample is cut out from the barrier resin layer 104. Next, the infrared absorption spectrum of the surface of the barrier resin layer 104 is obtained by infrared total reflection measurement (ATR method). From the obtained infrared absorption spectrum, the total peak areas A to D described above are calculated by the following procedures (1) to (4).

(1) Connect the absorbance at 1780 $cm^{-1}$ and 1493 $cm^{-1}$ by a straight line (N) and let the absorption spectrum of an absorption band in the range of equal to or more than 1493 $cm^{-1}$ and equal to or less than 1780 $cm^{-1}$ and the area surrounded by N be the total peak area A.

(2) Draw a straight line (O) vertically downward from an absorbance (Q) at 1690 $cm^{-1}$, let P be the intersection of N and O, draw a straight line (S) vertically downward from an absorbance (R) at 1598 $cm^{-1}$, let T be the intersection of N and S, and let the absorption spectrum of an absorption band in the range of equal to or more than 1598 $cm^{-1}$ and equal to or less than 1690 $cm^{-1}$ and the area surrounded by the straight line S, the point T, the straight line N, the point P, the straight line O, the absorbance Q, and the absorbance R be the total peak area B.

(3) Let the absorption spectrum of an absorption band in the range of equal to or more than 1690 $cm^{-1}$ and equal to or less than 1780 $cm^{-1}$ and the area surrounded by the absorbance Q, the straight line O, the point P, and the straight line N be the total peak area C.

(4) Let the absorption spectrum of an absorption band in the range of equal to or more than 1493 $cm^{-1}$ and equal to or less than 1598 $cm^{-1}$ and the area surrounded by the absorbance R, the straight line S, the point T, and the straight line N be the total peak area D.

Next, area ratios B/A, C/A, and D/A are obtained from the areas obtained by the above method.

Note that, it is possible for the measurement of the infrared absorption spectrum (infrared total reflection measurement: ATR method) of the present embodiment to be carried out, for example, using an IRT-5200 apparatus manufactured by JASCO Corporation, mounted with PKM-GE-S (Germanium) crystals, under conditions of an incident angle of 45°, room temperature, a resolution of 4 $cm^{-1}$, and an integration number of 100 times.

In the barrier resin layer 104 formed by a mixture including a polycarboxylic acid and a polyamine, there are two types of cross-linked structures, ionic cross-linking and amide cross-linking, and the occurrence ratio of these cross-linked structures is important from the viewpoint of improving the barrier performance. Note that, the ionic cross-linking described above is generated by the acid-base reaction of the carboxyl group included in the polycarboxylic acid and the amino group included in the polyamine, and the amide cross-linking described above is generated by a dehydration condensation reaction of the carboxyl group included in the polycarboxylic acid and the amino group included in the polyamine.

Accordingly, as a design guideline for improving the performance balance of the appearance, dimensional stability, and productivity while improving the barrier performances such as the oxygen barrier property and the water vapor barrier property under conditions of both high humidity and after the retort treatment, it is possible to apply the scale, that is, the area ratio of the amide bond indicated by B/A described above. Controlling the manufacturing conditions makes it possible to adjust the area ratio of the amide bond indicated by B/A described above of the barrier resin layer 104 to a specific value or more, and the barrier resin layer 104 having such a characteristic more effectively exhibits a barrier property under conditions of both high humidity and after the retort treatment, and is also excellent in the balance between appearance, dimensional stability, and productivity.

That is, using the barrier resin layer 104 having an amide bond area ratio indicated by B/A of the above lower limit value or more makes it possible to obtain the barrier laminate film 100 excellent in the balance between appearance, dimensional stability, and productivity while being superior in the oxygen barrier property and the water vapor barrier property under conditions of both high humidity and after the retort treatment.

Although the reason why the barrier resin layer 104 is excellent in the performance balance described above is not necessarily clear, it is considered that this is because the barrier resin layer 104 having the area ratio of the amide bond indicated by B/A in the above range is formed of a dense structure where the two types of cross-linked structures of the ionic cross-linking and amide cross-linking are well-balanced.

That is, it is considered that the fact that the area ratio of the amide bond indicated by B/A is within the above range means that the two types of cross-linked structures of the ionic cross-linking and amide cross-linking are formed in a well-balanced manner.

For the barrier resin layer 104 according to the present embodiment, in the infrared absorption spectrum, when a total peak area of an absorption band in a range of equal to or more than 1690 $cm^{-1}$ and equal to or less than 1780 $cm^{-1}$ is C, an area ratio of a carboxylic acid indicated by C/A is, from the viewpoint of further improving the balance between appearance, dimensional stability, and productivity, preferably 0.040 or more, more preferably 0.060 or more, and particularly preferably 0.080 or more.

In addition, from the viewpoint of further improving the oxygen barrier property and the water vapor barrier property under conditions of both high humidity and after the retort treatment, the upper limit of the area ratio of the carboxylic acid indicated by C/A is, preferably 0.500 or less, more preferably 0.450 or less, and particularly preferably 0.400 or less.

For the barrier resin layer 104 according to the present embodiment, in the infrared absorption spectrum, when a total peak area of an absorption band in a range of equal to or more than 1493 $cm^{-1}$ and equal to or less than 1598 $cm^{-1}$ is D, an area ratio of carboxylate indicated by D/A is, from the viewpoint of further improving the oxygen barrier property and the water vapor barrier property under conditions of both high humidity and after the retort treatment, preferably 0.100 or more and more preferably 0.150 or more.

In addition, from the viewpoint of further improving the balance between appearance, dimensional stability, and productivity, the upper limit of the area ratio of the carboxylate indicated by D/A is preferably 0.450 or less, more preferably 0.420 or less, and particularly preferably 0.400 or less.

It is possible to control the area ratio of the amide bond indicated by B/A, the area ratio of carboxylic acid indicated by C/A, and the area ratio of carboxylate indicated by D/A of the barrier resin layer 104 by appropriately adjusting the manufacturing conditions of the barrier resin layer 104. In the present embodiment, in particular, the blending ratio of the polycarboxylic acid and the polyamine, the method of preparing the barrier coating material, the method, temperature, time, and the like of the heat treatment of the barrier coating material are examples of factors for controlling the area ratio of the amide bond indicated by B/A, the area ratio of the carboxylic acid indicated by C/A, and the area ratio of the carboxylate indicated by D/A.

In order to obtain the barrier resin layer 104 where B/A described above is the lower limit value or more, it is important to tightly control the manufacturing conditions such as the blending ratio of the polycarboxylic acid and the polyamine, the method of preparing the barrier coating material, and the method, temperature, time, and the like of the heat treatment of the barrier coating material. That is, it is possible to obtain the barrier resin layer 104 where B/A described above is the lower limit value or more for the first time by a manufacturing method tightly controlling various factors relating to the following three conditions.

(1) Blending ratio of polycarboxylic acid and polyamine
(2) Method for preparing barrier coating material
(3) Method, temperature, and time of heat treatment of barrier coating material Description will be given below of an example of the method for manufacturing the barrier resin layer 104 according to the present embodiment.

First, description will be given of (1) the blending ratio of the polycarboxylic acid and the polyamine.

(Blending Ratio of Polycarboxylic Acid and Polyamine)

In the present embodiment, (the number of moles of —COO— groups included in the polycarboxylic acid in the barrier coating material)/(the number of moles of amino groups included in the polyamine in the barrier coating material) is preferably more than 100/22, more preferably 100/25 or more, and particularly preferably 100/29 or more.

On the other hand, in the present embodiment, (the number of moles of —COO— groups included in the polycarboxylic acid in the barrier coating material)/(the number of moles of amino groups included in the polyamine in the barrier coating material) is preferably 100/99 or less, more preferably 100/86 or less, and particularly preferably 100/75 or less. In order to obtain the barrier resin layer 104 according to the present embodiment, it is preferable to adjust the blending ratio of the polycarboxylic acid and the polyamine in the barrier coating material such that (the number of moles of —COO— groups included in the polycarboxylic acid in the barrier coating material)/(the number of moles of amino groups included in the polyamine in the barrier coating material) is in the above ranges.

(Polycarboxylic Acid)

The polycarboxylic acid according to the present embodiment has two or more carboxy groups in the molecule. Specifically, examples thereof include homopolymers of a,b-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the a,b-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one type or two or more types of polymers selected from polyacrylic acid, polymethacrylic acid, and a copolymer of acrylic acid and methacrylic acid are more preferable, at least one type of polymer selected from polyacrylic acid and polymethacrylic acid is even more preferable, and at least one type of polymer selected from a homopolymer of acrylic acid or a homopolymer of methacrylic acid is particularly preferable.

Here, in the present embodiment, polyacrylic acid includes both homopolymers of acrylic acid and copolymers of acrylic acid and another monomer. In a case of a copolymer of acrylic acid and another monomer, the polyacrylic acid generally includes constituent units which are derived from acrylic acid at 90% by mass or more, preferably 95% by mass or more, and more preferably 99% by mass or more in 100% by mass of the polymer.

In addition, in the present embodiment, polymethacrylic acid includes both homopolymers of methacrylic acid and copolymers of methacrylic acid and another monomer. In a case of a copolymer of methacrylic acid and another monomer, the polymethacrylic acid generally includes constituent units which are derived from methacrylic acid at 90% by mass or more, preferably 95% by mass or more, and more preferably 99% by mass or more in 100% by mass of polymer.

The polycarboxylic acid according to the present embodiment is a polymer where carboxylic acid monomers are polymerized and the molecular weight of the polycarboxylic acid is, from the viewpoint of excellent balance of barrier property and handleability, preferably 500 to 2,000,000, more preferably 1, 500 to 1,000,000, even more preferably 5,000 to 500,000, and particularly preferably 10,000 to 100,000.

Here, in the present embodiment, the molecular weight of the polycarboxylic acid is the conversion weight average molecular weight of polyethylene oxide and is measurable using Gel Permeation Chromatography (GPC).

(Polyamine)

The polyamine according to the present embodiment is a polymer having two or more amino groups in the main chain, side chain or terminal. Specifically, examples thereof include aliphatic polyamines such as polyallylamine, polyvinylamine, polyethyleneimine, and poly(trimethylene-imine); and apolyamides having amino groups on side chains such as polylysine and polyarginine. In addition, a polyamine where a portion of the amino group is modified may be used. From the viewpoint of obtaining favorable barrier properties, polyethylene imine is more preferable.

From the viewpoint of excellent balance of barrier properties and handleability, the weight average molecular weight of the polyamine according to the present embodiment is preferably 50 to 5,000,000, more preferably 100 to 2,000,000, even more preferably 1,500 to 1,000,000, still more preferably 1,500 to 500,000, and particularly preferably 1,500 to 100,000.

Here, in the present embodiment, it is possible to measure the molecular weight of the polyamine using an ebullioscopy method or a viscosity method.

Next, description will be given of (2) a method for preparing a barrier coating material. For example, it is possible to manufacture a barrier coating material as follows.

First, the carboxy group of the polycarboxylic acid is completely or partially neutralized by adding a base to the polycarboxylic acid. Next, the polyamine is added to the polycarboxylic acid in which the carboxy groups are completely or partially neutralized. Mixing the polycarboxylic acid and the polyamine according to such a procedure makes it possible to suppress the generation of aggregates of the polycarboxylic acid and the polyamine, and to obtain a uniform barrier coating material. This makes it possible to more effectively advance the dehydration condensation reaction between the —COO— group included in the polycarboxylic acid and the amino group included in the polyamine.

It is possible to suppress gelation from occurring by neutralizing the polycarboxylic acid with the base according to the present embodiment when mixing a polyamine and polycarboxylic acid. Accordingly, in the polycarboxylic acid, from the viewpoint of prevention of gelation, a product in which the carboxy groups are partially neutralized or completely neutralized by a base is preferably used. It is possible to obtain the neutralized product by partially or completely neutralizing the carboxy group of polycarboxylic acid with a base (that is, the carboxy group of the polycarboxylic acid is partially or completely made into carboxylate). This makes it possible to prevent gelation when adding a polyamine.

A partially neutralized product is prepared by adding a base to an aqueous solution of polycarboxylic acid and it is possible to set a desired neutralization degree by adjusting the ratio of the amounts of the polycarboxylic acid and the base. In the present embodiment, from the viewpoint of sufficiently suppressing gelation caused by the neutralization reaction with an amino group of a polyamine, the neutralization degree of the polycarboxylic acid by the base is preferably 30 to 100 equivalent %, 40 to 100 equivalent %, and more preferably 50 to 100 equivalent %.

It is possible to use an arbitrary water-soluble base as a base. It is possible to use either or both of a volatile base and a non-volatile base as a water-soluble base; however, a volatile base which is easily removed when drying or curing is preferable from the viewpoint of suppressing a deterioration in the barrier properties due to a residual free base.

Examples of volatile bases include ammonia, morpholine, alkylamine, 2-dimethyl amino ethanol, N-methylmonopholine, ethylene diamine, and tertiary amines such as triethylamine, an aqueous solution thereof or a mixture thereof. From the viewpoint of obtaining a favorable barrier property, an ammonia aqueous solution is preferable.

Examples of non-volatile bases include sodium hydroxide, lithium hydroxide, and potassium hydroxide, an aqueous solution thereof, or a mixture thereof.

In addition, from the viewpoint of improving coatability, the solid content concentration of the barrier coating material is preferably set to 0.5 to 15% by mass, and more preferably set to 1 to 10% by mass.

In addition, for the barrier coating material, it is preferable to further add a surfactant from the viewpoint of preventing the occurrence of cissing during coating. The addition amount of the surfactant is preferably 0.01 to 3% by mass, and more preferably 0.01 to 1% by mass when the total solid content of the barrier coating material is 100% by mass.

Examples of the surfactant according to the present embodiment include an anionic surfactant, a non-ionic surfactant, a cationic surfactant, an amphoteric surfactant, and, from the viewpoint of obtaining favorable coatability, non-ionic surfactants are preferable, and polyoxyethylene alkyl ethers are more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkylaryl ethers include polyoxyethylene nonylphenyl ether, polyoxyethylene octylphenyl ether, polyoxyethylene dodecylphenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane, and the like.

Examples of the acetylene alcohol surfactants include 2,4,7,9-tetramethyl-5-decyne-4,7-diol, 3,6-dimethyl-4-octyne-3,6-diol, 3,5-dimethyl-1-hexyne-3-ol, and the like.

Examples of fluorine-containing surfactants include fluorine alkyl ester, and the like.

The barrier coating material according to the present embodiment may include other additives within the range not impairing the object of the present invention. For example, various types of additive agents such as a lubricant, a slipping agent, an anti-blocking agent, an anti-static agent, an anti-fogging agent, a pigment, a dye, an inorganic or organic filler, and a polyvalent metal compound may be added.

Next, description will be given of (3) the method, temperature, and time of the heat treatment of the barrier coating material.

In order to obtain the barrier resin layer 104 according to the present embodiment, it is preferable to adopt the method, temperature, and time of the heat treatment of the barrier coating material which are able to effectively advance the dehydration condensation reaction between the —COO— group contained in the polycarboxylic acid and the amino group contained in the polyamine. Specifically, it is important to tightly control and combine each factor such as the coating amount of the barrier coating material, the type of an apparatus used for the heat treatment, the heat treatment temperature, the heat treatment time, and the like. In order to manufacture the barrier resin layer 104 according to the present embodiment, for example, the barrier coating material according to the present embodiment is coated on the inorganic material layer 103 such that the wet thickness is 0.05 to 300 μm, and heated and dried using a known apparatus used for heat treatment.

The method of drying and heat treatment is not particularly limited as long as it is possible to achieve the object of the present invention and any method capable of curing the barrier coating material and heating the cured barrier coating material may be used. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatment is preferable from the viewpoint of production efficiency. In particular, from the viewpoint of being usable for various purposes such as drying, heating, and annealing, it is preferable to use a hot air oven, and from the viewpoint of excellent thermal conductivity efficiency to the film, it is preferable to use a heating roll.

Further, methods used for the drying and heat treatments may be appropriately combined. A hot air oven and a heating roll may be used in combination, for example, if the barrier coating material is dried in a hot air oven and then subjected to a heat treatment with a heating roll, the heat treatment step duration becomes short, which is preferable from the viewpoint of production efficiency. In addition, it is preferable to perform the drying and heat treatment only with a hot air oven. In the case of drying the barrier coating material using a hot air oven, it is desirable to perform heat treatment under conditions where the heat treatment temperature is 160 to 250° C. and the heat treatment time is 1 second to 30 minutes, preferably where the heat treatment temperature is 180 to 240° C. and the heat treatment time is 5 seconds to 20 minutes, more preferably where the heat treatment temperature is 200° C. to 230° C. and the heat treatment time is 10 seconds to 15 minutes, and even more preferably where the heat treatment temperature is 200° C. to 220° C. and the heat treatment time is 15 seconds to 10 minutes.

Furthermore, as described above, it is possible to perform the heat treatment in a short time by using a heating roll therewith. Note that, from the viewpoint of effectively advancing the dehydration condensation reaction between the —COO— group included in the polycarboxylic acid and the amino group included in the polyamine, it is important to adjust the heat treatment temperature and the heat treatment time according to the wet thickness of the barrier coating material.

The method of coating the barrier coating material according to the present embodiment on a base material is not particularly limited, and it is possible to use an ordinary method. Examples thereof include coating methods using various known coating devices such as a Mayer bar coater, an air knife coater, gravure coaters such as a direct gravure coater, a gravure offset, arc gravure coaters, gravure reverse type coaters, and jet nozzle type coaters, reverse roll coaters such as atop feed reverse coater, a bottom feed reverse coater, and a nozzle feed reverse coater, a five-roll coater, a lip coater, a bar coater, a bar reverse coater, a die coater, an applicator.

The coating amount (wet thickness) is preferably 0.05 to 300 μm, more preferably 1 to 200 μm, and even more preferably 1 to 100 μm.

When the coating amount is the above upper limit value or less, it is possible to suppress curling of the obtained barrier laminate film 100. In addition, when the coating amount is the above upper limit value or less, it is possible to more effectively advance the dehydration condensation reaction between the —COO— group included in the polycarboxylic acid and the amino group included in the polyamine.

In addition, when the coating amount is the above lower limit value or more, it is possible to further improve the barrier performance of the obtained barrier laminate film 100.

The thickness of the barrier resin layer 104 after drying and curing is preferably equal to or more than 0.01 μm and equal to or less than 15 μm, more preferably equal to or more than 0.05 μm and equal to or less than 5.0 μm, more preferably equal to or more than 0.10 μm and equal to or less than 1.0 μm, and particularly preferably equal to or more than 0.10 μm and equal to or less than 0.50 μm.

When the thickness of the barrier resin layer 104 is the above lower limit value or more, it is possible to make barrier properties better. In addition, when the thickness of the barrier resin layer 104 is the above upper limit value or less, the ability to conform to external deformation becomes better and it is possible to make adhesion with the base material layer 101 better. That is, setting the thickness of the barrier resin layer 104 within the above range makes it possible to impart better conformability to the barrier resin layer 104, and as a result, even when external deformation is applied to the barrier laminate film 100, peeling would not easily occur between layers of the barrier resin layer 104 and the base material layer 101.

For the drying and heat treatment, a heat treatment may be carried out after drying, or drying and heat treatments may be carried out at the same time. The method of the drying and heat treatment is not particularly limited as long as it is a method capable of achieving the object of the present invention; however, a method using an oven is preferable from the viewpoint of being usable for various purposes such as drying, heating, and annealing, and a method using a heating roll is particularly preferable from the viewpoint that the thermal conductivity efficiency to the film for the purpose of heating is excellent.

The barrier resin layer 104 according to the present embodiment is formed from the barrier coating material described above and is obtained by coating the barrier coating material on the inorganic material layer 103 and then performing drying and heat treatment and curing the barrier coating material.

[Inorganic Material Layer]

Examples of the inorganic materials forming the inorganic material layer 103 include such as metals, metal oxides, metal nitrides, metal fluorides, and metal oxynitrides, which are able to form a thin film having barrier properties.

Examples of inorganic materials forming the inorganic material layer 103 include one type or two or more types selected from simple substances such as periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium; oxides, nitrides, fluorides, and oxynitrides.

Note that, in the present embodiment, the group name of the periodic table is indicated by the old CAS formula.

Furthermore, among the inorganic materials described above, one type or two or more types of inorganic materials selected from the group consisting of silicon oxides, silicon oxynitrides, silicon nitrides, aluminum oxides, and aluminum are preferable, due to being excellent in balance of barrier properties, cost, or the like.

Note that, silicon oxides may contain silicon monoxide and silicon suboxide in addition to silicon dioxide.

Among the inorganic materials, aluminum oxide is particularly preferable due to being excellent in water resistance by the retort treatment. In aluminum oxide, an abundance ratio (mole ratio) of aluminum (Al) and oxygen (O) is preferably Al:O=1:1.5 to 1:2.0.

The inorganic material layer 103 is formed of the inorganic material described above. The inorganic material layer 103 may be formed of a single inorganic material layer or a plurality of inorganic material layers. In addition, in a case where the inorganic material layer 103 is formed of a plurality of inorganic material layers, the inorganic material layer 103 may be formed of the same type of inorganic material layer or may be formed of different types of inorganic material layers.

From the viewpoint of balance of barrier properties, adhesiveness, and handleability, the thickness of the inorganic material layer 103 is usually equal to or more than 1 nm and equal to or less than 1000 nm, preferably equal to or more than 1 nm and equal to or less than 500 nm, more preferably equal to or more than 1 nm and equal to or less than 100 nm, even more preferably equal to or more than 1 nm and equal to or less than 50 nm, and particularly preferably equal to or more than 1 nm and equal to or less than 20 nm.

In the present embodiment, it is possible to obtain the thickness of the inorganic material layer 103 from observation images by a transmission electron microscope or a scanning electron microscope.

The method of forming the inorganic material layer 103 is not particularly limited, and it is possible to form the inorganic material layer 103 on a surface of the stress relaxation layer 102 by using, for example, a vacuum deposition method, an ion plating method, a sputtering method, a chemical vapor deposition method, a physical vapor deposition method, a chemical vapor deposition method (CVD method), a plasma CVD method, a sol-gel method, and the like. Among the above, film formation under reduced pressure such as a sputtering method, an ion plating method, a chemical vapor deposition method (CVD), a physical vapor deposition method (PVD), a plasma CVD method, and the like is desirable. Due to this, it is expected that quickly reacting the chemically active molecular species containing silicon such as silicon nitrides or silicon oxynitrides will make it possible to improve the smoothness of the surface of the inorganic material layer 103 and to reduce the number of pores.

In order to rapidly perform these bonding reactions, it is desirable that the inorganic atoms and compounds are chemically active molecular species or atomic species.

[Base Material Layer]

The base material layer 101 is formed of, for example, an organic material such as a thermosetting resin, a thermoplastic resin, or paper, and preferably includes at least one type of resin selected from a thermosetting resin and a thermoplastic resin.

Examples of thermosetting resins include known thermosetting resins such as an epoxy resin, an unsaturated polyester resin, a phenol resin, a urea melamine resin, a polyurethane resin, a silicone resin, and a polyimide.

Examples of thermoplastic resins include known thermoplastic resins such as polyolefin (polyethylene, polypropylene, poly(4-methyl-1-pentene), poly(1-butene), and the like), polyester (polyethylene terephthalate, polybutylene terephthalate, polyethylene naphthalate, and the like), polyamide (nylon-6, nylon-66, polymetaxylene adipamide, and the like), polyvinyl chloride, polyvinylidene chloride, polyimide, ethylene vinyl acetate copolymers or saponified products thereof, polyvinyl alcohol, polyacrylonitrile, polycarbonate, polystyrene, ionomers, fluorine resins, and mixtures thereof.

Among the above, from the viewpoint of improving transparency, one type or two or more types selected from polypropylene, polyethylene terephthalate, polybutylene terephthalate, polyethylene naphthalate, polyamide, and polyimide are preferable, and at least one type selected from polyethylene terephthalate and polyethylene naphthalate is more preferable.

In addition, the base material layer 101 formed by a thermoplastic resin may be a single layer or two or more layers depending on the use of the barrier laminate film 100.

In addition, the film formed of at least one type of resin selected from the thermosetting resin and the thermoplastic resin may be stretched in at least one direction, preferably a biaxial direction, to obtain the base material layer 101.

From the viewpoint of excellent transparency, rigidity and heat resistance, the base material layer 101 is preferably a biaxially stretched film formed of one type or two or more types of thermoplastic resins selected from polypropylene, polyethylene terephthalate, polybutylene terephthalate, polyethylene naphthalate, polyamide, and polyimide, and more preferably a biaxially stretched film formed of at least one type of thermoplastic resins selected from polyethylene terephthalate and polyethylene naphthalate.

In addition, the base material layer 101 may be subjected to a surface treatment in order to improve adhesion with the stress relaxation layer 102. Specifically, a surface activation treatment such as a corona treatment, a flame treatment, a plasma treatment, a primer coat treatment, or an ozone treatment may be performed.

The thickness of the base material layer 101 is preferably equal to or more than 1 µm and equal to or less than 1000 µm, more preferably equal to or more than 1 µm and equal to or less than 500 µm, and even more preferably equal to or more than 1 µm and equal to or less than 300 µm, from the viewpoint of obtaining favorable film properties.

The shape of the base material layer 101 is not particularly limited, but examples thereof include shapes such as a sheet, a film, a tray, a cup, and a hollow body.

[Stress Relaxation Layer]

In the barrier laminate film 100, from the viewpoint of improving barrier properties and adhesion between the base material layer 101 and the inorganic material layer 103 after the retort treatment, the stress relaxation layer 102 is provided on the base material layer 101. Providing the stress relaxation layer 102 between the base material layer 101 and the inorganic material layer 103 further improves conformability of the barrier resin layer 104 and makes it possible for the barrier resin layer 104 in the barrier laminate film 100 to maintain a more stable adhesion state even when external deformation is applied thereto.

The stress relaxation layer 102 is formed of a polyurethane-based resin having an aromatic ring structure in a main chain.

The polyurethane-based resin having the aromatic ring structure in the main chain is used in the stress relaxation layer 102, and for example, the polyurethane-based resin can be obtained by reacting a polyol, an organic polyisocyanate, and a chain extender for a water-dispersible polyurethane resin. Here, in the polyurethane-based resin according to the present embodiment, at least one of the polyol, the organic polyisocyanate, and the chain extender is a compound having an aromatic ring structure. This makes it possible to introduce aromatic ring structure into the main chain of the polyurethane-based resin.

In addition, introducing a silanol group into the polyurethane-based resin is even more preferable from the viewpoint of water resistance, heat resistance, adhesiveness, and the like.

From the viewpoint of improving the barrier properties of the barrier laminate film 100 after the retort treatment and the adhesion between the layers of the base material layer 101 and the barrier resin layer 104, the polyurethane-based resin according to the present embodiment is preferable to have a silanol group, is more preferable to have an aromatic polyester skeleton.

Here, the aromatic polyester skeleton can be introduced into the main chain of the polyurethane-based resin by using an aromatic polyester polyol as a polyol.

Examples of the polyol include a polymer diol, and the like. Examples of the polymer diol include polycarbonate-based diol, polyester-based diol, polycaprolactone-based diol, polyether-based diol, silicone-based diol, fluorine-based diol, and the like. Copolymers having a combination thereof may be used as a polymer diol, or one type or two or more types thereof may also be used in a combination as a polymer diol. Among these, the polyester-based diol is preferable, an aromatic polyester polyol with an aromatic dicarboxylic acid component is more preferable.

The aromatic dicarboxylic acid component used for the aromatic polyester polyol is not particularly limited, and terephthalic acid or isophthalic acid is preferable, and the alcohol component is also not particularly limited, and ethylene glycol, diethylene glycol, or polyethylene glycol is preferable.

In addition, a combination with a low molecular weight polyol and a polymer diol can be used as a polyol other than the above polymer diol.

As the low molecular weight polyols, for example, one type or two or more types selected from ethylene glycol, 1,2-propylene glycol, 1,3-propylene glycol, 1,3-butanediol, 1,4-butanediol, 2,2-dimethyl-1,3-propane diol, 1,6-hexanediol, 3-methyl-1,5-pentanediol, 1,8-octanediol, diethylene glycol, triethylene glycol, dipropylene glycol, tripropylene glycol, cyclohexane-1,4-diol, cyclohexane 1,4-dimethanol, trimethylolpropane, and glycerine can be used. In addition, adducts obtained by adding various alkylene oxides to bisphenol A can also be used.

Examples of the organic polyisocyanate include aromatic diisocyanates such as isomers of toluylene diisocyanate and 4,4-diphenylmethane diisocyanate, aromatic-aliphatic diisocyanates such as xylylene diisocyanate, alicyclic diisocyanates such as isophorone diisocyanate, 4,4-dicyclohexylmethane diisocyanate, and 1,3-bis(isocyanatemethyl) cyclohexane, aliphatic diisocyanates such as hexamethylene diisocyanate and 2,2,4-trimethylhexamethylene diisocyanate, or polyisocyanates such as dimers, trimers, biurets, and allophanates, which is derived from the above polyisocyanate monomer, and a combination thereof may be used.

Examples of the chain extender include known polyamines. Examples of the polyamines include diamines such as ethylene diamine, 1,2-propane diamine, 1,6-hexamethylene diamine, piperazine, 2,5-dimethyl piperazine, isophorone diamine, 4,4'-dicyclohexylmethane diamine, 3,3'-dimethyl-4,4'-dicyclohexylmethane diamine, and 1,4-cyclohexane diamine, polyamines such as diethylene triamine, dipropylene triamine, triethylene tetramine, and tetraethylene pentamine, compounds having amino group and hydroxyl group such as hydroxyethyl hydrazine, hydroxyethyldiethylene triamine, 2-[(2-aminoethyl)amino] ethanol, and 3-amino-propanediol, hydrazines, acid hydrazides. Further, examples of amine-based chain extender can include amine-based chain extenders with alkoxysilyl group.

The amine-based chain extender with alkoxysilyl group is a compound containing at least two active hydrogen groups and alkoxysilyl group in one molecule, specifically, examples thereof include such as N-β(aminoethyl)-γ-aminopropyl methyl dimethoxysilane, γ-(2-aminoethyl)aminopropyl triethoxysilane, γ-(2-aminoethyl)aminopropyl trimethoxysilane, γ-(2-aminoethyl)aminopropyl dimethoxysilane, γ-(2-aminoethyl)aminopropyl diethoxysilane, γ-aminopropyl trimethoxysilane, γ-aminopropyl triethoxysilane, γ-aminopropyl dimethoxysilane, γ-aminopropyl diethoxysilane, and N, N'-bis [a-(trimethoxysilyl)propyl] ethylenediamine.

Chain extenders can be used alone or in a combination.

In addition, the polyurethane-based resins having the aromatic ring structure in the main chain, which is used for the stress relaxation layer 102 is preferable to have a hydrophilic group in a molecular structure. By having the hydrophilic group in the molecular structure, it is possible to improve dispersibility and stability for a water-dispersible polyurethane resin.

As the hydrophilic group, for example, any hydrophilic group of cationic hydrophilic groups such as quaternary amine salts, anionic hydrophilic groups such as sulfonates or carboxylates, nonionic hydrophilic groups such as polyethylene glycol, a combination of the cationic hydrophilic groups and the nonionic hydrophilic groups, and a combination of the anionic hydrophilic groups and the nonionic hydrophilic groups can be adopted.

In order to introduce a carboxyl group into the polyurethane-based resin, for example, introducing as a copolymerization component by using a polyol compound having carboxyl group such as dimethylol propionic acid and dimethylol butanoic acid as a polyol component (polyhydroxy compound) may be performed, and then neutralization may be performed by a salt-forming agent. Specific examples of the salt-forming agent include trialkylamines such as ammonia, trimethylamine, triethylamine, triisopropylamine, tri-n-propylamine, and tri-n-butylamine, N-alkyl morpholines such as N-methyl morpholine and N-ethyl morpholine, and N-dialkyl alkanolamines such as N-dimethyl ethanolamine and N-diethyl ethanolamine. These can be used alone or in a combination of two or more types.

For obtaining the water-dispersible polyurethane-based resin, for example, a method such as a one-shot method, or a prepolymer method is used, and the prepolymer method is preferably used.

In the prepolymer method, for example, a polyol is reacted with an organic polyisocyanate to obtain an isocyanate group-terminated prepolymer. A solvent and a catalyst may be used appropriately.

Next, an emulsifier (external emulsifier) is added as necessary, the mixture is blended with an addition of an appropriate solvent, and water is added to disperse the isocyanate group-terminated prepolymer in water. Alternatively, the isocyanate group-terminated prepolymer may be dispersed in water by adding the prepolymer into the water.

Then, a chain extension reaction is carried out by blending a chain extender. Note that, the chain extender can also be divided and blended.

Then, the solvent is distilled off.

Thereby, the water-dispersible polyurethane-based resin can be obtained as a polyurethane resin aqueous dispersion in which the water-dispersible polyurethane-based resin is dispersed in water.

The water-dispersible polyurethane-based resin may be used in combination with a crosslinking agent for the purpose of improving heat resistance, water resistance, hydrolysis resistance, and the like. The crosslinking agent may be an external crosslinking agent added as a third component with respect to the water-dispersible polyurethane-based resin, or may be an internal crosslinking agent introducing a reaction point to be a crosslinking structure into a molecular structure of the water-dispersible polyurethane-based resin in advance.

As the crosslinking agent, compounds having an isocyanate group, an oxazoline group, a carbodiimide group, an epoxy group, a melamine resin, a silanol group, or the like can be used preferably, and compounds having a carbodiimide group is more preferable. In addition, in the case of using a compound having the carbodiimide group as a crosslinking agent, an addition amount of the compound having the carbodiimide group is preferably 0.1 to 3.0 mol, more preferably 0.2 to 2.0 mol, particularly preferably 0.3 to 1.0 mol of the carbodiimide group with respect to the carboxyl group of 1.0 mol in the polyurethane-based resin.

From the viewpoint of improving barrier properties of the barrier laminate film 100 after the retort treatment and adhesion between layers of the base material layer 101 and the barrier resin layer 104, in an infrared absorption spectrum of the stress relaxation layer 102, when a maximum peak of an absorption band in a range of equal to or more than 715 $cm^{-1}$ and equal to or less than 745 $cm^{-1}$ is $A_0$ and a maximum peak of an absorption band in a range of equal to or more than 1705 cm$^{-1}$ and equal to or less than 1735 cm$^{-1}$ is $A_1$, a ratio of the maximum peaks ($A_0/A_1$) is preferably equal to or more than 0.20 and equal to or less than 0.90, more preferably equal to or more than 0.30 and equal to or less than 0.80, even more preferably equal to or more than 0.40 and equal to or less than 0.70, and particularly preferably equal to or more than 0.50 and equal to or less than 0.70.

Here, $A_0/A_1$ represents an indicator of an aromatic ring concentration in the polyurethane-based resin. From the viewpoint of the oxygen barrier property, the water vapor barrier property, and the peel strength between the layers before and after the retort treatment, it is preferable that the aromatic ring concentration in the polyurethane-based resin is within the above range.

A thickness of the stress relaxation layer 102 is preferably 0.05 µm or more, more preferably 0.1 µm or more, and even more preferably 0.2 µm or more from the viewpoint of improving barrier properties of the barrier laminate film 100 after the retort treatment and adhesion between the layers of the base material layer 101 and the barrier resin layer 104, and the thickness of the stress relaxation layer 102 is preferably 1.0 µm or less and more preferably 0.6 µm or less from the viewpoint of cost.

[Heat Seal Layer]

The barrier laminate film 100 according to the present embodiment may be provided with a heat seal layer on at least one side in order to impart heat-sealing property.

Examples of the heat seal layer include layer formed by resin composition having one or two or more polyolefins selected from α-olefinhomopolymers or copolymers of ethylene, propylene, butene-1, hexene-1, 4-methyl-pentene-1, octene-1, and the like; high-pressure low-density polyethylene; linear low-density polyethylene (so-called LLDPE); high-density polyethylene; polypropylene; polypropylene random copolymer; low crystalline or non-crystalline ethylene-propylene random copolymer; ethylene-butene-1 random copolymer; and propylene-butene-1 random copolymer; layer formed by resin composition having ethylene-vinyl acetate copolymer (EVA); and layer formed by resin composition having EVA and polyolefin.

[Applications]

The barrier laminate film 100 can be suitably used as, for example, a packaging film for packaging such as foods, medical supplies, and daily goods, a panel film for vacuum heat insulation, a sealing film for sealing such as an electroluminescence element and a solar cell. Since the barrier laminate film 100 is excellent in barrier properties after the retort treatment and adhesion between the layers of the base material layer 101 and the barrier resin layer 104, the barrier laminate film 100 can be particularly and suitably used as a packaging material for retort food.

In addition, the barrier laminate film 100 can be suitably used as a film constituting a package. A package according to the present embodiment, for example, is a packaging bag itself used for the purpose of filling contents or the package filled with contents. In addition, depending on the applications, a packaging bag according to the present embodiment may be produced by using the barrier laminate film 100 in a part of the packaging bag or may be produced by using the barrier laminate film 100 in the whole packaging bag.

Since the package including the barrier laminate film 100 according to the present embodiment can be particularly and suitably used as a package for retort food from the view point of excellent barrier properties after the retort treatment and adhesion between the layers of the base material layer 101 and the barrier resin layer 104.

Although the embodiments of the present invention were described with reference to the drawings, these are examples of the present invention, and it is also possible to adopt various configurations other than those described above.

EXAMPLES

Detailed description will be given below of the present embodiment with reference to examples and comparative examples. Note that, the present embodiment is not at all limited to the description of these examples.

<Preparation of Solution (Z)>

Purified water was added to a mixture of ammonium polyacrylate (manufactured by Toagosei Co, Ltd., trade name: Aron A-30, 30% by mass aqueous solution, molecular weight: 100,000) to obtain a 10% by mass solution of ammonium polyacrylate aqueous solution.

<Preparation of Solution (Y)>

Purified water was added to polyethyleneimine (manufactured by Wako Pure Chemical Industries, Ltd., trade name: polyethyleneimine, average molecular weight: approximately 10,000) to obtain a polyethyleneimine aqueous solution in a 10% by mass solution.

<Preparation of Solution (V)>

79 g of the solution (Z) and 21 g of the solution (Y) were mixed and stirred to prepare a mixed solution.

Furthermore, purified water was added such that the solid content concentration of the mixed solution described above became 2.5% by mass and stirred until the solution became homogeneous, and then a non-ionic surfactant (polyoxyethylene lauryl ether, manufactured by Kao Corporation, trade name: EMULGEN 120) was mixed therein so as to be 0.3% by mass with respect to the solid content of the mixed solution to prepare a solution (V).

Examples 1 to 6 and Comparative Examples 1 to 5

Example 1

A biaxially stretched polyethylene terephthalate film (manufactured by Unitika Ltd., PET12) having a thickness of 12 µm was set as a base material and a stress relaxation layer having a thickness of 0.10 µm after drying was formed by coating the film with a resin composition of the following constitution using Mayer bar on one side and drying.

(Constitution)

Main agent: Polyurethane resin aqueous dispersion (manufactured by Mitsui Chemicals, Inc., trade name: TAKELAC WS-4032, aromatic polyester type polyurethane resin)

Crosslinking agent: compound having carbodiimide group (Nisshinbo Chemical Inc., trade name: CARBODILITE SV-02)

Mixing ratio: A main agent was blended with a crosslinking agent so that the carbodiimide group in the crosslinking agent was 0.4 mol with respect to 1.0 mol of the carboxyl group of the polyurethane resin in the main agent.

Next, an aluminum oxide film having a thickness of 7 nm was formed by heating and evaporating the aluminum and performing vapor deposition while introducing oxygen, on the stress relaxation layer by a high-frequency induction heating method. Due to this, an aluminum oxide vapor-deposited PET film was obtained. A water vapor permeability of the aluminum oxide vapor-deposited PET film was 1.5 g/(m$^2$·24 h).

Next, the solution (V) was coated on the vapor-deposited surface of the aluminum oxide vapor-deposited PET film with an applicator so that the thickness of the barrier resin layer after drying was 0.30 μm, dried using a hot air dryer under conditions of a temperature of 100° C. for 30 seconds, and subjected to a further heating treatment for 10 minutes at 215° C. to obtain a barrier laminate film.

Example 2

A barrier laminate film was obtained in the same manner as in Example 1 except that a thickness of a stress relaxation layer after drying was 0.20 μm.

Example 3

A barrier laminate film was obtained in the same manner as in Example 1 except that a thickness of a stress relaxation layer after drying was 0.40 μm.

Example 4

A barrier laminate film was obtained in the same manner as in Example 1 except that trade name TAKELAC WS-4031 manufactured by Mitsui Chemicals, Inc. (aromatic polyester type polyurethane resin) was used as a polyurethane resin aqueous dispersion in forming a stress relaxation layer.

Example 5

A barrier laminate film was obtained in the same manner as in Example 4 except that a thickness of a stress relaxation layer after drying was 0.20 μm.

Example 6

A barrier laminate film was obtained in the same manner as in Example 4 except that a thickness of a stress relaxation layer after drying was 0.40 μm.

Comparative Example 1

A biaxially stretched polyethylene terephthalate film (manufactured by Unitika Ltd., PET 12) having a thickness of 12 μm was set as a base material and an aluminum oxide film having a thickness of 8 nm was formed by heating and evaporating the aluminum using a high-frequency induction heating method on the corona-treated surface thereof, and performing vapor deposition while introducing oxygen. Due to this, an aluminum oxide vapor-deposited PET film was obtained. A water vapor permeability of the aluminum oxide vapor-deposited PET film was 1.5 g/(m$^2 \cdot$24 h). The solution (V) was coated on the vapor-deposited surface of the aluminum oxide vapor-deposited PET film with an applicator so that the thickness of the barrier resin layer after drying was 0.30 μm, dried using a hot air dryer under conditions of a temperature of 100° C. for 30 seconds, and subjected to a further heating treatment for 10 minutes at 215° C. to obtain a barrier laminate film.

Comparative Example 2

A barrier laminate film was obtained in the same manner as in Example 1 except that a resin composition of the following constitution was used as the resin composition when forming a stress relaxation layer and a thickness of the stress relaxation layer after drying was 0.05 μm.

(Constitution)

Main agent: Polyurethane resin aqueous dispersion (manufactured by Mitsui Chemicals, Inc., trade name: TAKELAC WS-4022, aliphatic polyester type polyurethane resin)

Cross-linking agent: isocyanate-based compound (manufactured by Mitsui Chemicals, Inc., trade name: WD-725)

Mixing ratio: A main agent was blended with a crosslinking agent so that the isocyanate group in the crosslinking agent was 1.0 mol with respect to 1.0 mol of hydroxyl group of the polyurethane resin in the main agent.

Comparative Example 3

A barrier laminate film was obtained in the same manner as in Comparative Example 2 except that an acrylic polyol (manufactured by Toray Fine Chemicals Co., Ltd., trade name: COATAX LH-681) was used as a main agent of a resin composition when forming a stress relaxation layer and an isocyanate-based compound (manufactured by Mitsui Chemicals, Inc., trade name: TAKELAC A-10) was used as a crosslinking agent.

Comparative Example 4

A barrier laminate film was obtained in the same manner as in Comparative Example 3 except that an acrylic polyol (manufactured by Toray Fine Chemicals Co., Ltd., trade name: COATAX LH-635) was used as a main agent of a resin composition when forming a stress relaxation layer.

Comparative Example 5

A barrier laminate film was obtained in the same manner as in Comparative Example 2 except that a composition was used in which an oxazoline group-containing aqueous polymer (A) (manufactured by Nippon Shokubai Co., Ltd., "Epocros WS-300J (solid content concentration: 10% by mass)"), an aqueous acrylic-based resin (B) (manufactured by Toagosei Co., Ltd., "Jurymer ET-410J (solid content concentration: 30% by mass)"), and aqueous polyester-based resin (C) (manufactured by Nippon Synthetic Chemical Industry Co., Ltd., "Polyester WR-961J (solid content concentration: 30% by mass)") are prepared such that a solid content ratio (mass ratio) thereof was (A)/(B)/(C)=23.7/57.2/19.1, a thickness after drying was 0.06 μm, and a thickness of a barrier resin layer was 0.30 μm, as a resin composition when forming a stress relaxation payer.

The barrier laminate films obtained in the Examples and Comparative Examples were evaluated as follows. The obtained result is shown in Table 1.

<Preparation of Multilayer Film for Evaluating Physical Properties>

(1) An ester-based adhesive agent (12 parts by mass of an polyester-based adhesive agent (manufactured by Mitsui Chemicals Polyurethane, Inc., trade name: TAKELAC A 310), 1 part by mass of an isocyanate-based curing agent (manufactured by Mitsui Chemicals Polyurethane, Inc., trade name: TAKENATE A3), and 7 parts by mass of ethyl acetate) was coated on one surface of an unstretched polyethylene film having a thickness of 50 μm (manufactured by Mitsui Chemicals Tohcello, Inc., trade name: T.U.X FC-S). After drying, a multilayer film (a sample for measuring physical properties before retorting) is obtained by pasting the unstretched polyethylene film and an amide cross-linked surface together (dry lamination).

(2) An ester-based adhesive agent (9 parts by mass of polyurethane-based adhesive agent (manufactured by Mitsui Chemicals, Inc., trade name: TAKELAC A525S), 1 part by mass of an isocyanate-based curing agent (manufactured by Mitsui Chemicals, Inc., trade name: TAKENATE A50), and 7.5 parts by mass of ethyl acetate) were coated on one surface of an unstretched polypropylene film having a thickness of 70 μm (manufactured by Mitsui Chemicals Tohcello, Inc., trade name: RXC-22). After drying, a multilayer film (a sample for measuring physical properties after retorting) is obtained by pasting the unstretched polypropylene film and an amide cross-linked surface together (dry lamination).

(3) Retort Treatment

The multilayer film obtained in (2) above was folded back such that the unstretched polypropylene film became the inner surface and the two sides were heat sealed to form a bag shape, then 70 cc of water was added thereto as the content and the other side was heat sealed to form a bag, which was subjected to a retort treatment under conditions of 130° C. for 30 minutes in a high-temperature and high-pressure retort sterilizer. After the retort treatment, the water content was drained to obtain a multilayer film after the retort treatment.

(4) Measurement of Peel Strength

After collecting the multilayer film obtained by the above method before and after the retort treatment in a width of 15 mm, in order to make a trigger for peeling off the barrier laminate film, the corners of the sample were partially peeled off between the unstretched polyethylene film layer or the unstretched polypropylene film layer and the barrier laminate film, then, at a peeling speed of 300 (mm/min), the laminate peeling strength at 180° was measured. The sample after the retort treatment was measured in a wet state.

(5) Oxygen Permeability [ml/(m$^2$ 24 h MPa)]

The multilayer film obtained by the above method was measured according to JIS K7126 using OX-TRAN 2/21 manufactured by Mocon Inc. under conditions of a temperature of 20° C. and a humidity of 90% RH.

(6) Water Vapor Permeability [g/(m$^2$ 24 h)]

An ester-based adhesive agent (12 parts by mass of a polyester-based adhesive agent (manufactured by Mitsui Chemicals Polyurethane, Inc., trade name: TAKELAC A310), 1 part by mass of an isocyanate-based curing agent (manufactured by Mitsui Chemicals Polyurethane, Inc., trade name: TAKENATE A3), and 7 parts by mass of ethyl acetate) was coated and dried on one surface of an unstretched polypropylene film having a thickness of 50 μm (manufactured by Mitsui Chemical Tohcello Inc., trade name: T.U.X. FCS). Then, the barrier laminate films obtained in Comparative Examples and Examples and the barrier surface were pasted together (dry lamination) to obtain a multilayer film. The obtained multilayer film was overlapped such that the unstretched polypropylene film was the inner surface, the barrier laminate film was folded back, the three sides were heat sealed and formed into a bag, then calcium chloride was added as the content, a bag was prepared by heat sealing the last side such that the surface area became 0.01 m$^2$, and the bag was allowed to stand for 300 hours under conditions of 40° C. and 90% RH, and the water vapor permeability was measured by the difference in weight.

(7) IR Area Ratio of Barrier Resin Layer

Measurement of the infrared absorption spectrum (infrared total reflection measurement: the ATR method) was carried out using an IRT-5200 apparatus manufactured by JASCO Corporation on which PKM-GE-S (Germanium) crystals are mounted under conditions of an incident angle of 45°, room temperature, a resolution of 4 cm$^{-1}$, and an integration number of 100 times. The obtained absorption spectrum was analyzed by the above-described method, and the total peak areas A to D were calculated. Then, area ratios B/A, C/A, and D/A were determined from the total peak areas A to D.

(8) IR Peak Height Ratio of Stress Relaxation Layer ($A_0/A_1$)

The polyurethane resin aqueous dispersion was coated by using bar coater on a vapor-deposited surface of the aluminum oxide vapor-deposited PET film of thickness of 12 μm in which aluminum oxide is vapor-deposited so that a dried thickness was approximately 2 μm, then the stress relaxation layer was formed by drying the polyurethane resin aqueous dispersion by heating at 110° C. for 1 minute using a dryer.

Next, the infrared absorption spectrum of the surface of the stress relaxation layer was measured by infrared total reflection measurement (ATR method). Here, when a peak height (absorbance) of a maximum peak of an absorption band from a base line in a range of equal to or more than 715 cm$^{-1}$ and equal to or less than 745 cm$^{-1}$ is $A_0$ and a peak height (absorbance) of a maximum peak of an absorption band from a base line in a range of equal to or more than 1705 cm$^{-1}$ and equal to or less than 1735 cm$^{-1}$ is $A_1$, $A_0/A_1$ was calculated.

TABLE 1

| | Base material | Stress relaxation layer | | | | Barrier resin layer | | | | | | Before retort treatment | | | After retort treatment at 130° C. for 30 minutes | | | | |
| | | IR peak height ratio $(A_0/A_1)$ [-] | Skeleton of resin | Thickness T [µm] | Thickness [µm] | Number of moles of —COO— groups included in polycarboxylic acid/ Number of moles of amino groups included in polyamine [-] | IR area ratio B/A [-] | IR area ratio C/A [-] | IR area ratio D/A [-] | Oxygen permeability [ml/(m²·24 h·MPa)] | Water vapor permeability [g/m²·24 h] | 180° peel strength [N/15 mm] | Oxygen permeability [ml/(m²·24 h·MPa)] | Water vapor permeability [g/m²·24 h] | 180° peel strength [N/15 mm] | P/T [-] |
|---|---|---|---|---|---|---|---|---|---|---|---|---|---|---|---|---|
| Comparative Example 1 | aluminum oxide vapor-deposited PET | — | — | — | 0.30 | 100/55 | 0.53 | 0.16 | 0.31 | 0.6 | 0.4 | 0.6 | 1.3 | 2.5 | 0.1 | — |
| Example 1 | aluminum oxide vapor-deposited PET | 0.63 | aromatic polyester | 0.10 | 0.30 | 100/55 | 0.53 | 0.16 | 0.31 | 0.7 | 0.6 | 1.6 | 1.6 | 2.4 | 1.2 | 12.0 |
| Example 2 | aluminum oxide vapor-deposited PET | | aromatic polyester | 0.20 | 0.30 | 100/55 | 0.53 | 0.16 | 0.31 | 0.8 | 0.3 | 1.8 | 1.3 | 2.4 | 1.8 | 9.0 |
| Example 3 | aluminum oxide vapor-deposited PET | | aromatic polyester | 0.40 | 0.30 | 100/55 | 0.53 | 0.16 | 0.31 | 0.8 | 0.2 | 1.6 | 1.8 | 2.5 | 2.4 | 6.0 |
| Example 4 | aluminum oxide vapor-deposited PET | 0.68 | aromatic polyester | 0.10 | 0.30 | 100/55 | 0.53 | 0.16 | 0.31 | 0.8 | 0.5 | 1.6 | 1.4 | 2.4 | 1.3 | 13.0 |
| Example 5 | aluminum oxide vapor-deposited PET | | aromatic polyester | 0.20 | 0.30 | 100/55 | 0.53 | 0.16 | 0.31 | 0.8 | 0.3 | 1.7 | 1.6 | 2.4 | 1.6 | 8.0 |
| Example 6 | aluminum oxide vapor-deposited PET | | aromatic polyester | 0.40 | 0.30 | 100/55 | 0.53 | 0.16 | 0.31 | 0.8 | 0.3 | 1.9 | 2.0 | 2.5 | 2.2 | 5.5 |

TABLE 1-continued

| | | Stress relaxation layer | | | Barrier resin layer | | | | | | Before retort treatment | | | After retort treatment at 130° C. for 30 minutes | | | |
|---|---|---|---|---|---|---|---|---|---|---|---|---|---|---|---|---|---|
| | Base material | IR peak height ratio (A₀/A₁) [-] | Skeleton of resin | Thickness T [μm] | Thickness [μm] | Number of moles of —COO— groups included in polycarboxylic acid/ Number of moles of amino groups included in polyamine [-] | IR area ratio B/A [-] | IR area ratio C/A [-] | IR area ratio D/A [-] | Oxygen permeability [ml/(m²·24 h·MPa)] | Water vapor permeability [g/m²·24 h] | 180° peel strength [N/15 mm] | Oxygen permeability [ml/(m²·24 h·MPa)] | Water vapor permeability [g/m²·24 h] | 180° peel strength [N/15 mm] | P/T [-] |
| Comparative Example 2 | aluminum oxide vapor-deposited PET | 0.05 | aliphatic polyester | 0.05 | 0.30 | 100/55 | 0.53 | 0.16 | 0.31 | 0.7 | 2.0 | 1.5 | 2.0 | 4.7 | 1.3 | 26.0 |
| Comparative Example 3 | aluminum oxide vapor-deposited PET | 0.04 | acryl | 0.05 | 0.30 | 100/55 | 0.53 | 0.16 | 0.31 | 0.7 | 2.4 | 0.7 | 1.2 | 4.0 | 0.6 | 12.0 |
| Comparative Example 4 | aluminum oxide vapor-deposited PET | 0.18 | acryl | 0.05 | 0.30 | 100/55 | 0.53 | 0.16 | 0.31 | 0.8 | 0.3 | 0.8 | 0.5 | 2.2 | 0.2 | 4.0 |
| Comparative Example 5 | aluminum oxide vapor-deposited PET | — | acryl/ oxazoline/ polyester | 0.06 | 0.30 | 100/55 | 0.53 | 0.16 | 0.31 | 2.8 | 0.4 | 6.7 | 6.3 | 1.7 | 0.3 | 5.0 |

The barrier laminate films obtained in Examples, as compared with the laminate films obtained in Comparative Examples, are excellent in balance between an oxygen barrier property and a water vapor barrier property before and after the retort treatment, and an adhesion between layers of the base material layer and the barrier resin layer before and after the retort treatment.

This application claims priority based on Japanese Patent Application No. 2017-072765 filed on Mar. 31, 2017, the disclosure of which is incorporated herein in its entirety.

The invention claimed is:

1. A barrier laminate film comprising:
   a base material layer;
   a stress relaxation layer;
   an inorganic material layer; and
   a barrier resin layer in this order,
   wherein the barrier resin layer includes an amide cross-linked compound of a polycarboxylic acid and a polyamine,
   the stress relaxation layer includes a polyurethane-based resin having an aromatic ring structure in a main chain, and
   the polyurethane-based resin includes an aromatic polyester skeleton.

2. The barrier laminate film according to claim 1, wherein a 180° peel strength P between the base material layer and the barrier resin layer, measured under conditions of 25° C. and a tension rate of 300 mm/min after subjecting the barrier laminate film to a retort treatment at 130° C. for 30 minutes is 0.5 N/15 mm or more.

3. The barrier laminate film according to claim 1, wherein, when a 180° peel strength between the base material layer and the barrier resin layer, measured under conditions of 25° C. and a tension rate of 300 mm/min after subjecting the barrier laminate film to a retort treatment at 130° C. for 30 minutes is P [N/15 mm] and a thickness of the stress relaxation layer is T [μm], P/T is equal to or more than 2.0 and equal to or less than 15.0.

4. The barrier laminate film according to claim 1, wherein a thickness of the stress relaxation layer is equal to or more than 0.05 μm and equal to or less than 1.0 μm.

5. The barrier laminate film according to claim 1, wherein a water vapor permeability at 40° C. and 90% RH is 4.0 g/(m$^2$·24h) or less.

6. The barrier laminate film according to claim 1, wherein an oxygen permeability at 20° C. and 90% RH is 10.0 ml/(m$^2$·24h·MPa) or less.

7. The barrier laminate film according to claim 1, wherein, in an infrared absorption spectrum of the stress relaxation layer, when a maximum peak of an absorption band in a range of equal to or more than 715 cm$^{-1}$ and equal to or less than 745 cm$^{-1}$ is $A_0$ and a maximum peak of an absorption band in a range of equal to or more than 1705 cm$^{-1}$ and equal to or less than 1735 cm$^{-1}$ is $A_1$, a ratio of the maximum peaks ($A_0/A_1$) is equal to or more than 0.20 and equal to or less than 0.90.

8. The barrier laminate film according to claim 1, wherein the inorganic material layer contains one type or two or more types of inorganic materials selected from the group consisting of silicon oxide, silicon oxynitride, silicon nitride, aluminum oxide, and aluminum.

9. The barrier laminate film according to claim 1, wherein, in an infrared absorption spectrum of the barrier resin layer, when a total peak area of an absorption band in a range of equal to or more than 1493 cm$^{-1}$ and equal to or less than 1780 cm$^{-1}$ is A, and a total peak area of an absorption band in a range of equal to or more than 1598 cm$^{-1}$ and equal to or less than 1690 cm$^{-1}$ is B, an area ratio of an amide bond indicated by B/A is 0.370 or more.

10. The barrier laminate film according to claim 1, wherein a water vapor permeability at 40° C. and 90% RH after subjecting the barrier laminate film to a retort treatment at 130° C. for 30 minutes is 4.0 g/(m$^2$·24h) or less.

11. The barrier laminate film according to claim 1, wherein a thickness of the barrier resin layer is equal to or more than 0.01 μm and equal to or less than 15 μm.

12. The barrier laminate film according to claim 1, wherein an oxygen permeability at 20° C. and 90% RH after subjecting the barrier laminate film to a retort treatment at 130° C. for 30 minutes is 10.0 ml/(m$^2$·24h·MPa) or less.

13. The barrier laminate film according to claim 1, wherein the barrier laminate film is used for a packaging material for retort food.

* * * * *